United States Patent [19]
Ando

[11] Patent Number: 5,917,438
[45] Date of Patent: *Jun. 29, 1999

[54] DATA STORING AND OUTPUTTING APPARATUS

[75] Inventor: Ichiro Ando, Yokosuka, Japan

[73] Assignee: Victor Company of Japan, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/668,331

[22] Filed: Jun. 25, 1996

[30] Foreign Application Priority Data

Jun. 30, 1995 [JP] Japan .................................. 7-188085

[51] Int. Cl.$^6$ ...................................................... H03M 7/34
[52] U.S. Cl. ............................... 341/51; 341/61; 341/123
[58] Field of Search ................................ 341/50, 51, 61, 341/123; 348/714, 715, 721, 385, 390, 394; 375/240, 506

[56] References Cited

U.S. PATENT DOCUMENTS

| | | | |
|---|---|---|---|
| 5,469,212 | 11/1995 | Lee | 348/392 |
| 5,510,858 | 4/1996 | Shido et al. | 248/714 |
| 5,537,409 | 6/1996 | Moriyama et al. | 370/471 |
| 5,565,921 | 10/1996 | Sasaki et al. | 348/392 |
| 5,574,506 | 11/1996 | Rhodes | 348/459 |
| 5,589,993 | 12/1996 | Naimpally | 386/81 |
| 5,596,581 | 1/1997 | Saeijs et al. | 370/394 |
| 5,621,840 | 4/1997 | Kawamura et al. | 386/68 |

*Primary Examiner*—Jeffrey Gaffin
*Assistant Examiner*—Kim Huynh
*Attorney, Agent, or Firm*—Parkhurst & Wendel

[57] ABSTRACT

A first data storing and outputting apparatus includes a coding unit for coding data of a program through N coding processes and generating N sets of coded data of the program, N being a natural number more than one, a memory for storing the N sets of coded data of the program, and a reading and outputting circuit responsive to a request for selectively reading and outputting one of the N sets of coded data of the program from the memory. A second data storing and outputting apparatus includes a first coder for coding data of a program according to a first coding process and generating first coded data of the program, a memory for storing the first coded data of the program, a reading circuit responsive to a request for reading the first coded data of the program from the memory, a decoder for decoding the first coded data of the program from the memory, a second coder for coding an output of the decoder according to a second coding processing and generating second coded data of the program, a data rate adjusting circuit for adding dummy data to the first coded data from the memory and outputting third coded data having a data rate higher than a data rate of the first coded data, and a switch for outputting either of the first coded data from the memory, second coded data, or the third coded data according to a predetermined condition.

20 Claims, 2 Drawing Sheets

DATA STORING AND OUTPUTTING APPARATUS

BACKGROUND OF THE INVENTION

1. Field of the Invention

This invention relates to a data storing and outputting apparatus for storing coded data and reading and outputting the stored data and particularly to a data storing and outputting apparatus for storing coded video data or sound data and reading and outputting the stored data.

2. Description of the Prior Art

A data storing and outputting apparatus for storing program information including video data and sound data and then, reading and outputting it as necessary is known.

In this apparatus, to suppress a capacity of a memory and decrease input and output data rates, the video data and the sound data are compression-coded before storing them in the memory because the video data and the sound data have a large amount of data.

In the compression coding, there is a tendency that a quality in decoding and a capability of data processing decrease with an increase in the compression rate.

That is, to increase the compression rate, quantizing is made coarse or a coding block length is made larger by a prediction coding such as the interframe predictive coding. However, if it is required to keep the quality in decoding high or to keep the capability of data processing high, a compression coding having a low compression rate should be performed.

On the other hand, the coding data rate may be limited if the coded data read from a memory is recorded in another storing medium again or is transmitted to a transmission line.

For example, in a transmission line employing the ATM (Asynchronous Transfer Mode), it is difficult keep a transmission line having a high data rate in a high traffic condition, so that the user is forced to use a transmission line having a low data rate.

In the case of the transmission line having a low data rate, it is necessary to output data coded at the data rate corresponding to the data rate of the transmission line.

In the prior art data storing and outputting apparatus, the output data rate is fixed.

SUMMARY OF THE INVENTION

The aim of the present invention is to provide an improved data storing and outputting apparatus.

According to the present invention, a first data storing and outputting apparatus is provided, which comprises: a coder for coding data of a program through N coding processings and generating N sets of coded data of the program, N being a natural number more than one; a memory for storing the N sets of coded data of the program; and a reading and outputting controlling circuit responsive to a request for selectively reading and outputting one of the N sets of coded data of the program from the memory.

In the first data storing and outputting apparatus, the coder generates the N sets of coded data having different data rates. In this case, the first data storing and outputting apparatus may further comprise a data rate adjusting circuit for adding dummy data to one of N sets of coded data from the memory and outputting the resultant data having a data rate higher than one of N sets of coded data from the memory.

According to this invention, a second data storing and outputting apparatus is provide, which comprises: a first coder for coding data of a program in accordance with a first coding processing and generating first coded data of the program; a memory for storing the first coded data of the program; and a reading and output control circuit responsive to a request for reading the first coded data of the program from the memory; a decoder for decoding the first coded data of the program from the memory; a second coder for coding an output of the decoder in accordance with a second coding processing and generating second coded data of the program; and a switch for outputting either of the first coded data from the memory or the second coded data in accordance with a predetermined condition.

In the second data storing and outputting apparatus, the second coder generates the second coded data having a data rate lower than a data rate of the first coder.

According to this invention, a third data storing and outputting apparatus is provided, which comprises: a first coder for coding data of a program in accordance with a first coding processing and generating first coded data of the program; a memory for storing the first coded data of the program; a reading and outputting control circuit responsive to a request for reading the first coded data of the program from the memory; a decoder for decoding the first coded data of the program from the memroy; a second coder for coding an output of the decoder in accordance with a second coding processing and generating second coded data of the program; a data rate adjusting circuit for adding dummy data to the first coded data from the memory and outputting third coded data having a data rate higher than a data rate of the first coded data; and a switch for outputting either of the first coded data from the memory, second coded data, or the third coded data in accordance with a predetermined condition.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
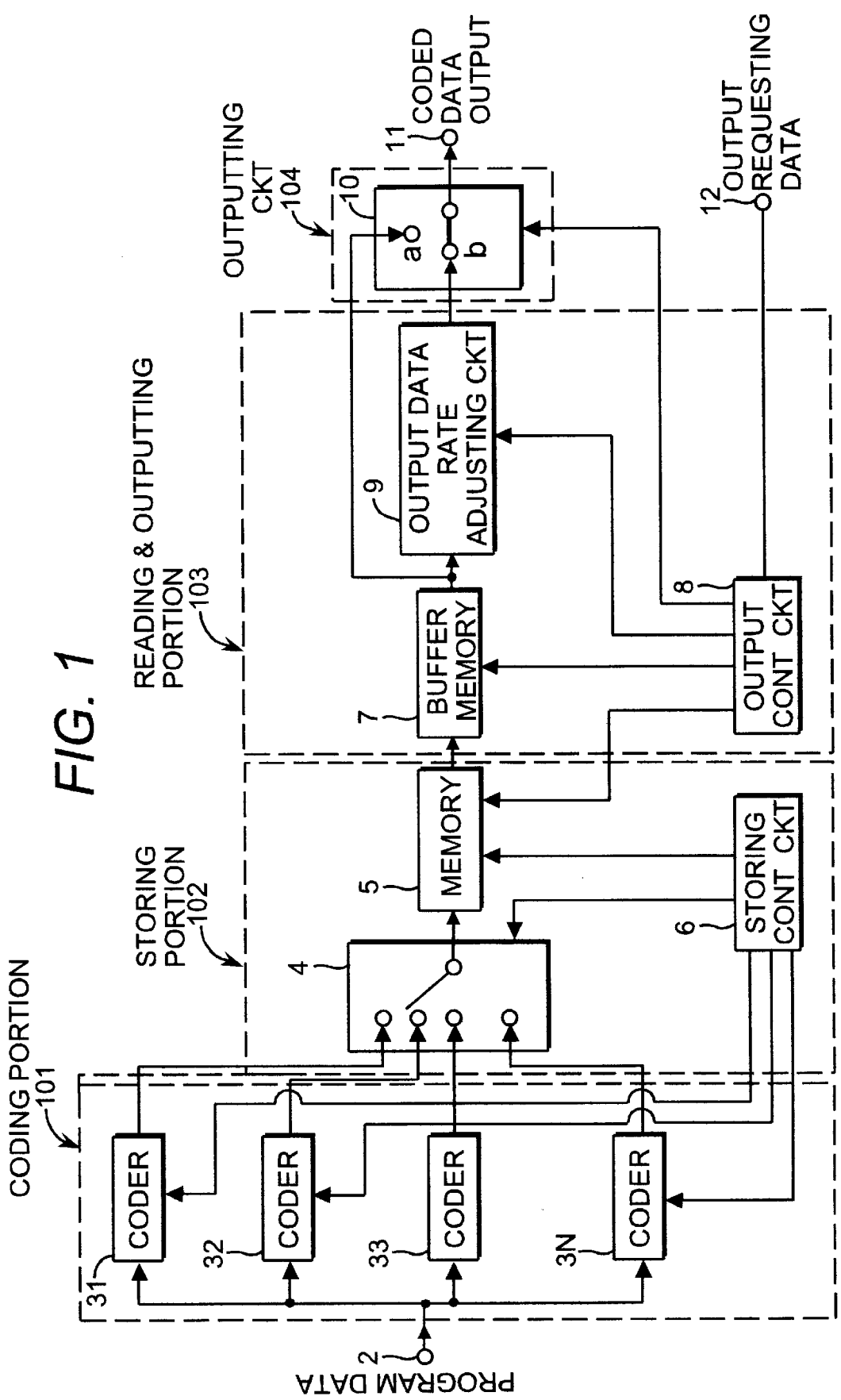
FIG. 1 is a block diagram of a data storing and outputting apparatus of a first embodiment.

Hereinbelow will be described a first embodiment of this invention. FIG. 1 is a block diagram of a data storing and outputting apparatus of the first embodiment.

A data storing and outputting apparatus of the first embodiment comprises, a coding portion 101 for coding data of a program (program data) through N coding processings and generating N sets of coded data of the program, N being a natural number more than one, a storing portion 102 for storing the N sets of coded data of the program, and a reading and outputting portion 103 responsive to an output request data for selectively reading and outputting one of the N sets of coded data of the program from the storing portion 102.

More specifically, the coding portion 101 comprises N coders 31 to 3N for coding the program data through N different coding process having different data rates respectively.

The storing portion 102 comprises, a switch 4 for selectively outputting each of outputs of the N coders 31 to 3N in response to a first switching control signal, a memory 5 for storing outputs of the N coders 31 to 3N from the switch 4 sequentially, and a storing control circuit 6 for controlling the coders 31 to 3N, the switch 4 with the first switching control signal, and the memory 5 to store each of the N sets of data in the memory 5 sequentially.

The reading and outputting portion 103 comprises an outputting control circuit 8 for reading one of the N sets of data stored in the memory 5 as read data, a buffer memory 7 for temporally storing the read data from the memory 5 and outputting the read data stored therein, and outputting circuit 104 including a switch 10 and an output data rate adjusting circuit 9 for outputting the read data from the buffer memory with its data rate adjusted, wherein the switch 10 outputs either of the output of the buffer memory 7 or the output of the output data rate adjusting circuit 9 in response to a second switching control signal from the output control circuit 8 which responds to an output requesting data.

The program data (data of a program) including a video signal and a sound signal is supplied to coders 31 to 3N through an input terminal 2.

The coders 31 to 3N code the program data through different coding processings to have different data rates to generate N sets of coded data.

For example, the coder 31 codes the program data in accordance with the coding method of the MPEG standard (ISO/IEC1172) standardized by ISO/IEC such that all frames of the video signal is coded to have a data rate of 50 Mbps by the intraframe coding method and the sound signal is coded to have a data rate of 384 Kbps by the layer 2 coding method. Thus, the coder 31 outputs multiplexed coded data of 53 Mbps including the video signal and the sound signal and additional information for multiplexing the coded data of the video signal and the coded data of the sound signal.

The coder 32 codes the video signal to have a data rate of 6 Mbps through a coding method assigning the interaframe coding, the forward interframe prediction coding, and the bi-directional interframe coding at a certain rate and codes the sound signal to have a data rate of 256 kbps by the layer 2 coding method. Thus, the coder 32 outputs multiplexed data of 7 Mbps including the coded data of the video signal, the coded data of the sound signal, and additional information for multiplexing the coded data of the video signal and the coded data of the sound signal.

The coder 33 effects a filtering processing to the video signal to reduce the resolution of the video data to reduce a rate of pixels and codes it to have a data rate of 1.2 Mbps through the coding method assigning the intraframe coding, the forward interframe prediction coding, and the bi-directional interframe coding at a certain rate. The sound signal is coded to have a data rate of 192 kbps by the layer 2 coding method. Then, the coder 33 outputs multiplexed data of 1.5 Mbps including the coded data of the video signal, the coded data of the sound signal, and additional information for multiplexing the coded data of the video signal and the coded data of the sound signal.

The switch 4 sequentially outputs each of outputs of the coders 31 to 3N in response to the first switching control signal from the storing control circuit 6. The storing controlling circuit 6 sequatially stores the data from the switch 4 in the memory 5 at a predetermined storing area.

This storing operation is made as follows:

The programs data is supplied to N times and the memory 5 stores the program data coded by the N coders 31 to 3N sequentially by switching the switch 4 N times. Alternatively, if the data rate of storing data of the memory 5 is larger than a sum of the coding data rates of all coders 31 to 3N, the memory 5 can stores the coded data by time-division manner by switching the switch 4 and providing buffer memories between the coders 31 to 3N and the switch 4 to temporally store respeceive coded data.

As mentioned, the memory 5 stores N sets of coded data having different data rates coded from the program data through different coding processings. The memory 5 stores a plurality of sets of programs data within its capacity.

The output control circuit 8 is supplied with the output requesting data indicative of the desired coded program data, the desired one of the coding processings, and a desired output data rate. The output data rate corresponds to a data rate of a transmission line through which the output data is transmitted.

The output control circuit 8 selects one of N coded data stored in the memory 5 in response to the output requesting data.

In this operation, the selected data rate is smaller than the data rate indicated by the output requesting data. However, an excessive decrease in the video image quality can be suppressed by selecting the coded data having a data rate less than but nearest to the commanded output data rate.

The desired set of coded data selected by the output control circuit 8 is read out at the predetermined region in the memory 5 in response to an output of the output control circuit 8. The read data is temporally stored in the buffer memory 7 and supplied to the switch 10 and to the output data rate adjusting circuit 9.

The buffer memory 7 is used to match the data rate between the read data from the memory 5 and the data rate of the output data rate adjusting circuit 9 and the switch 10.

The output data rate adjusting circuit 9 outputs the coded data from the buffer 7 with dummy data added to the coded data in response to a command from the output control circuit 8 when the data rate of the coded data is lower than the commanded output data rate such that the coding data rate is equal to the output data rate.

The output control circuit 8 operates the switch 10 to output the coded data via the contact "a" thereof when the coding data rate is equal to the commanded output data rate and to output the coded data through the output data rate adjusting circuit 9 via a contact "b" thereof when the coding rate is lower than the commanded output data rate.

In this embodiment, a set of the reading and storing portion 103 is provided. However, it is also possible to provide a plurality of the reading and outputting portion 103 including the output control circuit 8, the buffer memory 7, output data rate adjusting circuit 9, the switch 10 and these sets of reading and storing portion 103 are coupled to the memory 8 by time-divisional access, so that a plurality of outputs are provided by reading the coded data from the memory 5 at a higher data rate than a total of the data rate of the plurality of reading and the storing portion 103.

Figure 2:
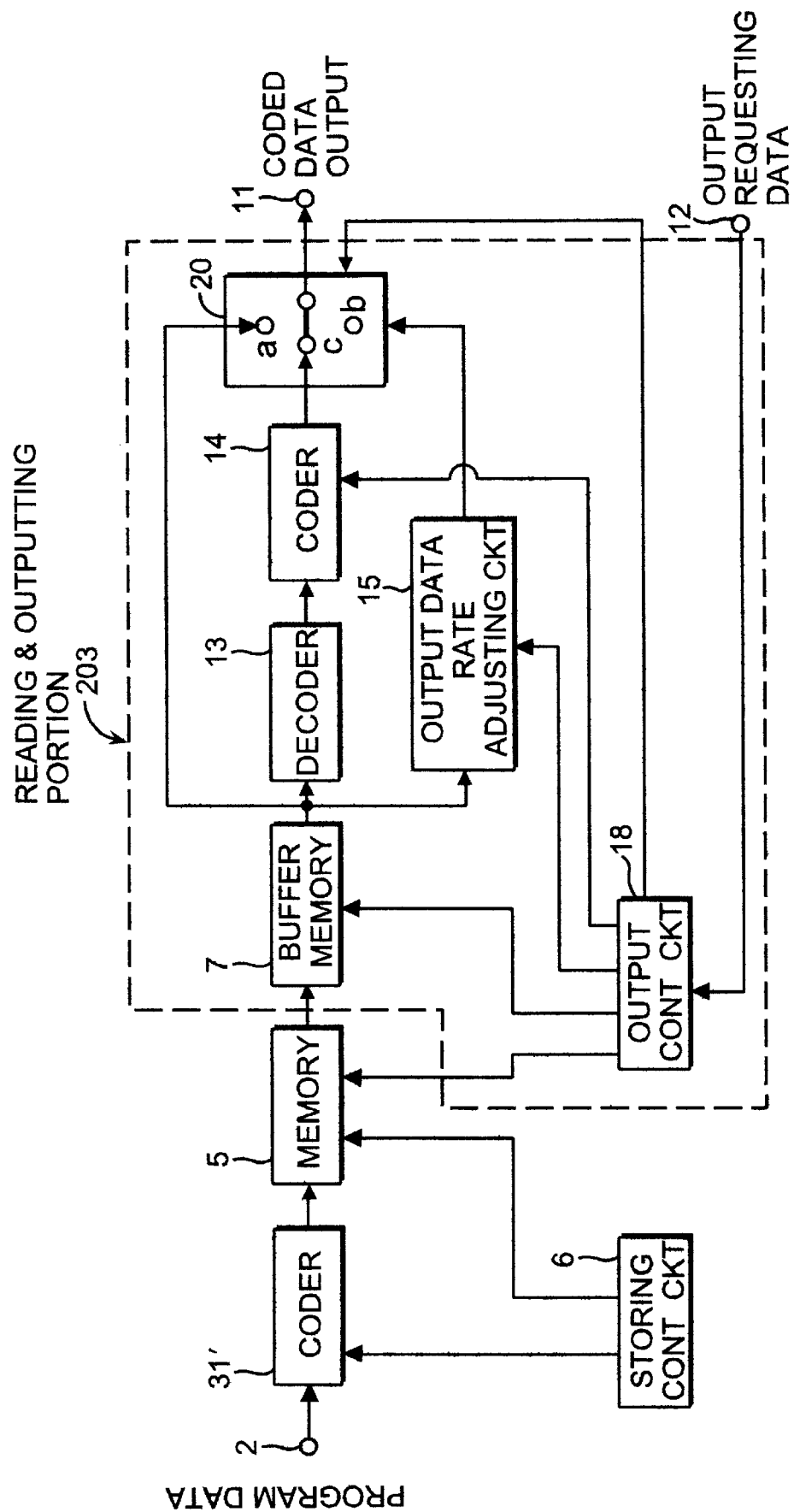
FIG. 2 is a block diagram of a data storing and outputting apparatus of a second embodiment.

A second embodiment will be described. FIG. 2 is a block diagram of a data storing and outputting apparatus of the second embodiment.

The data storing and outputting apparatus of the second embodiment comprises a coder for coding data of a program in accordance with a first coding processing and generating first coded data of the program, a memory 5 for storing the first coded data of the program, an output control circuit 18 responsive to a request for reading the first coded data of the program from the memory 5, a decoder 13 for decoding the first coded data of the program from the memory 5, a second coder 14 for coding an output of the decoder 13 in accordance with a second coding processing and generating second coded data of the program, a data rate adjusting circuit 15 for adding dummy data to the first coded data from the memory 5 and outputting third coded data having a data rate higher than a data rate of the first coded data, and a switch 20 for outputting either of the first coded data from the memory 5, the second coded data, or the third coded data in accordance with a predetermined condition.

The program data (data of a program) including a video signal and a sound signal is supplied to the coder through an input terminal 2.

The coder 31' codes the program data through a predetermined coding processing to have a predetermined data rate to generate coded data.

For example, the coder 31' codes the program data in accordance with the coding method of the MPEG standard (IS0/IEC1172) standardized by ISO/IEC such that all frames of the vide signal is coded to have a data rate of 50 Mbps by the intraframe coding method and the sound signal is coded to have a data rate of 384 Kbps by the layer 2 coding method. Thus, the coder 31' outputs multiplexed coded data of 53 Mbps including the video signal and the sound signal and additional information for multiplexing the coded data of the video signal and the coded data of the sound signal is generated.

The coded data is stored in the memory 5 at a predetermined region in accordance with the command from the storing control circuit 6.

The memory 5 stores a plurality of sets of coded programs data within its capacity.

The output control circuit 18 is supplied with the output requesting data indicative of the desired coded program data, desired one of the coding processings, and an output data rate. The output data rate corresponds to a data rate of a transmission line through which the output data is transmitted.

Outputs of the reading and outputting control circuit 18 are supplied to the memory 5 and the buffer memory 7 and selects one set of coded program data stored in the memory 5.

The coded data read from the buffer memory 7 is supplied to the switch 20, decoder 13, and the output data rate adjusting circuit 15.

The decoder 13 decodes the coded data and supplies decoded data to the coder 14.

The coder 14 codes the data from the decoder 13 at a coding data rate in accordance with the command from the output control circuit through one of decoding processings selected in accordance with the command from the output control circuit 18.

For example, if the output requesting data indicates that the coding data rate is 1.5 Mbps, the coder 14 effects a filtering processing to the video signal to reduce the resolution of the video data to reduce a rate of pixels and codes it to have a data rate of 1.2 Mbps through the coding method assigning the intraframe coding, the forward interframe prediction coding, and the bi-directional interframe coding at a certain rate.

The sound signal is coded to have a data rate of 192 kbps by the layer 2 coding method. Then, the coder 14 outputs multiplexed data of 1.5 Mbps including the coded data of the video signal, the coded data of the sound signal, and additional information for multiplexing the coded data of the video signal and the coded data of the sound signal.

The output data rate adjusting circuit 15 outputs the coded data from the buffer 7 with dummy data added to the coded data in response to a command from the reading and output control circuit 18 when the data rate of the coded data is lower than the commanded output data rate such that the coding rate is equal to the output data rate.

Moreover, this invention includes the case that the decoder 13 and the coder 14 operate as follows:

For example, if the output requesting data indicates that the coding data rate is 1.8 Mbps, the decoder 13 effects dividing the multiplexed coded moving picture video data and the coded sound data and decoding the coded moving picture video data to supply the decoded moving picture video data and the coded sound data to the coder 14.

The coder 14 effects a filtering processing to the decoded moving picture video signal to reduce the resolution of the video data to reduce a rate of pixels and codes it to have a data rate of 1.2 Mbps through the coding method assigning the intraframe coding, the forward interframe prediction coding, and the bi-directional interframe coding at a certain rate.

Then, the coder 14 outputs multiplexed data of 1.8 Mbps including the coded data of the moving picture video signal, the coded data of the sound signal, and additional information for multiplexing the coded data of the video signal and the coded data of the sound signal.

That is, in response to the output request data, the decoder 13 effects separating the coded program data into the coded moving picture data and the coded sound data and decoding at least one coded data to supply the coded data and the other coded data to the coder 14.

Then, the coder 14 codes the decoded data in response to the output request data and multiplexes the coded data and the other coded data to generate a predetermined coded program data.

The reading and output control circuit 18 operates the switch 20 to output either of the coded data via the contact "a" thereof, the coded data by the coder 14 via the contact "c", or the coded data through the output data rate adjusting circuit 15 via a contact "b" thereof in accordance with the output requesting data.

In this embodiment, a set of the reading portion 203 is provided. However, it is also possible to provide a plurality of the reading portions 203, each including the output control circuit 18, the buffer memory 7, the decoder 13, the coder 14, the output data rate adjusting circuit 15, the switch 20 and these sets of reading portion 203 are coupled to the memory 5 by time-divisional access, so that a plurality of outputs are provided by reading the coded data from the memory 5 at a higher data rate than a total of the data rate of the plurality of reading portion 203.

What is claimed is:

1. A data storing and outputting apparatus comprising:
   coding means for coding one set of data of a program through N coding processes and generating N sets of coded data of said program from said one set of data of said program, N being a natural number more than one;
   storing means for storing said N sets of coded data of said program; and
   reading and outputting means responsive to a request for selectively reading and outputting one of said N sets of coded data of said program from said storing means, wherein said coding means generates said N sets of coded data having different data rates.

2. A data storing and outputting apparatus as claimed in claim 1, further comprising data rate adjusting means responsive to a command for adding dummy data to said one of said N sets of coded data from said reading and outputting means and outputting the resultant data having a data rate higher than said one of said N sets of coded data from said reading and outputting means when a data rate of said one of said N sets of coded data is lower than an output data rate indicated by said command.

3. A data storing outputting apparatus as claimed in claim 1, wherein said storing means stores said N sets of coded data of the whole of said program.

4. A data storing and outputting apparatus as claimed in claim 1, further comprising data rate adjusting means for adding dummy data to said one of said N sets of coded data from said reading and outputting means and outputting resultant data having a data rage higher than said one of said N sets of coded data from said reading and outputting means.

5. A data storing and outputting apparatus as claimed in claim 4, wherein said data rate adjusting means is responsive to a command and outputs the resultant data having said data rate higher than said one of said N sets of coded data from said reading and outputting means when a data rate of said one of said N sets of coded data is lower than an output data rate indicated by said command.

6. A data storing and outputting apparatus comprising:
   first coding means for coding data of a program in accordance with a first coding processing and generating first coded data of said program;
   storing means for storing said first coded data of said program;
   reading means responsive to a request for reading said first coded data of said program from said storing means;
   decoding means for decoding said first coded data of said program from said reading means;
   second coding means responsive to a data rate command for coding an output of said decoding means in accordance with a second coding processing and generating second coded data of said program at a data rate determined in accordance with said data rate command; and
   switching means for outputting either of said first coded data from said reading means or said second coded data in accordance with an output requesting data.

7. A data storing and outputting apparatus comprising:
   first coding means for coding data of a program in accordance with a first coding processing and generating first coded data of said program;
   storing means for storing said first coded data of said program;
   reading means responsive to a request for reading said first coded data of said program from said storing means:
   decoding means for decoding said first coded data of said program from said reading means;
   second coding means responsive to a data rate command for coding an output of said decoding means in accordance with a second coding processing and generating second coded data of said program at said data rate determined in accordance with said data rate command; and
   switching means for outputting either of said first coded data from said reading means or said second coded data in accordance with an output requesting data, wherein said second coding means generates said second coded data having a data rate lower than a data rate of said first coding means in accordance with said data rate command.

8. A data storing and outputting apparatus comprising:
   first coding means for coding data of a program in accordance with a first coding processing and generating first coded data of said program;
   storing means for storing said first coded data of said program;
   reading means responsive to a request for reading said first coded data of said program from said storing means;
   decoding means for decoding said first coded data of said program from said reading means;
   second coding means for coding an output of said decoding means in accordance with a second coding processing and generating second coded data of said program;
   data rate adjusting means for adding dummy data to said first coded data from said reading means and outputting third coded data having a data rate higher than a data rate of said first coded data; and
   switching means for outputting either of said first coded data from said reading means, second coded data, or said third coded data in accordance with an output requesting data.

9. A data storing and outputting apparatus comprising:
   a terminal for receiving one set of data including at least video data of a program;
   coding means for coding said one set of data at least video data of said program through N different coding processes and generating N sets of coded video data of said program from said one set of data including at least video data of said program, N being a natural number more than one;
   storing means for storing said N sets of coded video data of said program; and
   reading and outputting means responsive to a request for selectively reading and outputting one of said N sets of coded video data of said program from said storing means.

10. A data storing and outputting apparatus as claimed in claim 9, wherein said coding means generates said N sets of coded video data having different data rates.

11. A data storing and outputting apparatus as claimed in claim 10, further comprising data rate adjusting means for adding dummy data to said one of said N sets of coded video data from said reading and outputting means and outputting the resultant data having a data rate higher than said one of said N sets of coded video data from said reading and outputting means when a data rate of said one of said N sets of coded video data is lower than an output data rate.

12. A data storing and outputting apparatus comprising:
   first coding means for coding data of a program in accordance with a first coding processing and generating first coded data of said program;
   storing means for storing said first coded data of said program;
   reading means responsive to a request for reading said first coded data of said program from said storing means;
   decoding means for decoding said first coded data of said program from said reading means;

second coding means responsive to a data rate command for coding an output of said decoding means in accordance with a second coding processing and generating second coded data of said program at a data rate determined in accordance with said data rate command;

data rate adjusting means responsive to an output data rate command for adding dummy data to said first coded data from said reading means and outputting third coded data having a data rate higher than a data rate of said first coded data when a data rate of the first coded data is lower than a data rate of said output data rate command; and switching means for outputting either of said first coded data from said reading means, second coded data, or said third coded data in accordance with an output requesting data, wherein said second coding means generates said second coded data of said program having a data rate lower than a data rate of said first coded data.

13. A data storing and outputting apparatus comprising:

first coding means for coding data of a program in accordance with a first coding processing and generating first coded data of said program;

storing means for storing said first coded data of said program;

reading means responsive to a request for reading and outputting said first coded data of said program from said storing means;

decoding means for decoding said first coded data of said program from said reading means; and second coding means responsive to a data rate command for coding an output of said decoding means in accordance with a second coding processing and generating and outputting second coded data of said program at a data rate determined in accordance with said data rate command.

14. A data storing and outputting apparatus as claimed in claim 13, further comprising:

switching means for outputting either of said first coded data from said reading means or said second coded data in accordance with an output requesting data.

15. A data storing and outputting apparatus comprising:

first coding means for coding data of a program in accordance with a first coding processing and generating first coded data of said program;

storing means for storing said first coded data of said program;

reading means responsive to a request for reading and outputting said first coded data of said program from said storing means;

decoding means for decoding said first coded data of said program from said reading means; and second coding means responsive to a data rate command for coding an output of said decoding means in accordance with a second coding processing and generating and outputting second coded data of said program at said data rate determined in accordance with said data rate command, wherein said second coding means generates said second coded data having a data rate lower than a data rate of said first coding means in accordance with the data rate command.

16. A data storing and outputting apparatus as claimed in claim 15, further comprising:

switching means for outputting either of said first coded data from said reading means or said second coded data from said second coding means in accordance with an output requesting data.

17. A data storing and outputting apparatus comprising:

first coding means for coding data of a program in accordance with a first coding processing and generating first coded data of said program;

storing means for storing said first coded data of said programs;

reading means responsive to a request for reading and outputting said first coded data of said program from said storing means;

decoding means for decoding said first coded data of said program from said reading means;

second coding means for coding an output of said decoding means in accordance with a second coding processing and generating and outputting second coded data of said program; and data rate adjusting means for adding dummy data to said first coded data from said reading means and outputting third coded data having a data rate higher than a data rate of said first coded data.

18. A data storing and outputting apparatus as claimed in claim 17, further comprising:

switching means for outputting either of said first coded data from said reading means, second coded data, or said third coded data in accordance with an output requesting data.

19. A data storing and outputting apparatus comprising:

first coding means for coding data of a program in accordance with a first coding processing and generating first coded data of said program;

storing means for storing said first coded data of said program;

reading means responsive to a request for reading and outputting said first coded data of said program from said storing means;

decoding means for decoding said first coded data of said program from said reading means;

second coding means responsive to a data rate command for coding an output of said decoding means in accordance with a second coding processing and generating and outputting second coded data of said program at a data rate determined in accordance with said data rate command;

data rate adjusting means responsive to an output data rate command for adding dummy data to said first coded data from said reading means and outputting third coded data having a data rate higher than a data rate of said first coded data when a data rate of the first coded data is lower than a data rate of said output data rate command, wherein said second coding means generates said second coded data of said program having a data rate lower than a data rate of said first coded data.

20. A data storing and outputting apparatus as claimed in claim 19, further comprising:

switching means for outputting either of said first coded data from said reading means, second coded data, or said third coded data in accordance with an output requesting data.

* * * * *